US008670935B2

(12) United States Patent
Griffin et al.

(10) Patent No.: US 8,670,935 B2
(45) Date of Patent: Mar. 11, 2014

(54) TAGGING A LOCATION BY PAIRING DEVICES

(75) Inventors: Jason Tyler Griffin, Kitchener (CA); Scott David Reeve, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 368 days.

(21) Appl. No.: 12/857,732

(22) Filed: Aug. 17, 2010

(65) Prior Publication Data
US 2012/0046862 A1 Feb. 23, 2012

(51) Int. Cl.
H04W 4/02 (2009.01)
(52) U.S. Cl.
USPC .................. 701/469; 455/201; 455/456.1
(58) Field of Classification Search
USPC ............... 701/201; 455/41.1, 456.1
See application file for complete search history.

(56) References Cited

U.S. PATENT DOCUMENTS

| | | | |
|---|---|---|---|
| 6,405,125 B1 | 6/2002 | Ayed | |
| 2007/0167174 A1* | 7/2007 | Halcrow et al. | 455/456.2 |
| 2007/0264974 A1 | 11/2007 | Frank et al. | |
| 2009/0005061 A1* | 1/2009 | Ward et al. | 455/456.1 |
| 2009/0098907 A1* | 4/2009 | Huntzicker et al. | 455/556.1 |
| 2009/0131012 A1 | 5/2009 | Ashley, Jr. et al. | |
| 2009/0201850 A1 | 8/2009 | Davis et al. | |
| 2010/0068997 A1* | 3/2010 | Dunko | 455/41.1 |

FOREIGN PATENT DOCUMENTS

| | | |
|---|---|---|
| GB | 2466189 A | 6/2010 |
| WO | 03002942 A1 | 1/2003 |
| WO | 2009106686 A1 | 9/2009 |

OTHER PUBLICATIONS

European Search Report from corresponding EP Application dated Apr. 2, 2011.
First Examination report from corresponding European Application No. 10 173 021.6 dated May 15, 2012.

* cited by examiner

Primary Examiner — Mary Cheung
Assistant Examiner — Yuen Wong
(74) Attorney, Agent, or Firm — Gowling Lafleur Henderson LLP

(57) ABSTRACT

A method of tagging a location using a mobile device entails obtaining position data for a current location of the mobile device, detecting a proximity of another device using a short-range wireless interface, and automatically storing the position data for the current location of the mobile device in response to the detecting of the proximity of the other device. The proximity detector may comprise a near field communication (NFC) interface, a Bluetooth® transceiver or another short-range wireless technology that may be employed to detect the proximity of another device. This technology enables two devices to store a current location to facilitate a subsequent rendezvous back at that same location.

16 Claims, 7 Drawing Sheets

TAGGING A LOCATION BY PAIRING DEVICES

CROSS-REFERENCE TO RELATED APPLICATIONS

This is the first application filed for the present technology.

TECHNICAL FIELD

The present technology relates generally to mobile devices and, in particular, to location-aware mobile devices.

BACKGROUND

An increasing number of wireless communications devices or mobile devices have Global Positioning System (GPS) chipsets that provide position data. This position data may be used for navigation or other location-based services. Another use of position data is location tagging in which the mobile device stores location data (e.g. location coordinates) for the current location of the device. This enables the user of the device to remember a specific location or to return to that location at a later time. One of the primary shortcomings of current location tagging techniques is that it requires manual input from the user to signal to the device that the current location coordinates are to be stored in memory. If the user of the device forgets to manually tag the location, then the device will not store the location data for subsequent usage.

Techniques for automatically tagging a location would thus be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology generally provides a novel method, computer-readable medium and mobile device for automatic location tagging. A short-range proximity detector on the device triggers the storage of position data for the current location of the device. For example, the short-range proximity detector may comprise a near field communications (NFC) interface. Other short-range wireless technologies, e.g. Bluetooth® may be utilized. By simply bringing two mobile devices into close proximity with one another, the devices can be "paired" (connected). This connection or pairing may constitute a proximity detection event that triggers the storage of position data for the current location of the two paired devices. This establishes a rendezvous location to facilitate the task of returning to the rendezvous location. The proximity detector may also be configured to trigger the storage of position data when the devices lose connectivity (as opposed to establishing connectivity).

Accordingly, an aspect of the present technology is a method of tagging a location using a mobile device. The method entails obtaining position data for a current location of the mobile device, detecting a proximity of another device using a short-range wireless interface, and automatically storing the position data for the current location of the mobile device in response to the detecting of the proximity of the other device.

Another aspect of the present technology is a computer readable medium upon which are stored instructions in code that are configured to perform the steps of the foregoing method when the computer readable medium is loaded into memory and executed on a processor of a mobile device.

Another aspect of the present technology is a mobile device mobile device for tagging a location. The mobile device comprising a short-range proximity detector, a positioning system for generating position data for a current location of the mobile device, and a processor operatively connected to a memory for storing the position data for the current location of the mobile device in response to a detection event of the proximity detector.

The details and particulars of these aspects of the technology will now be described below, by way of example, with reference to the attached drawings.

Figure 1:
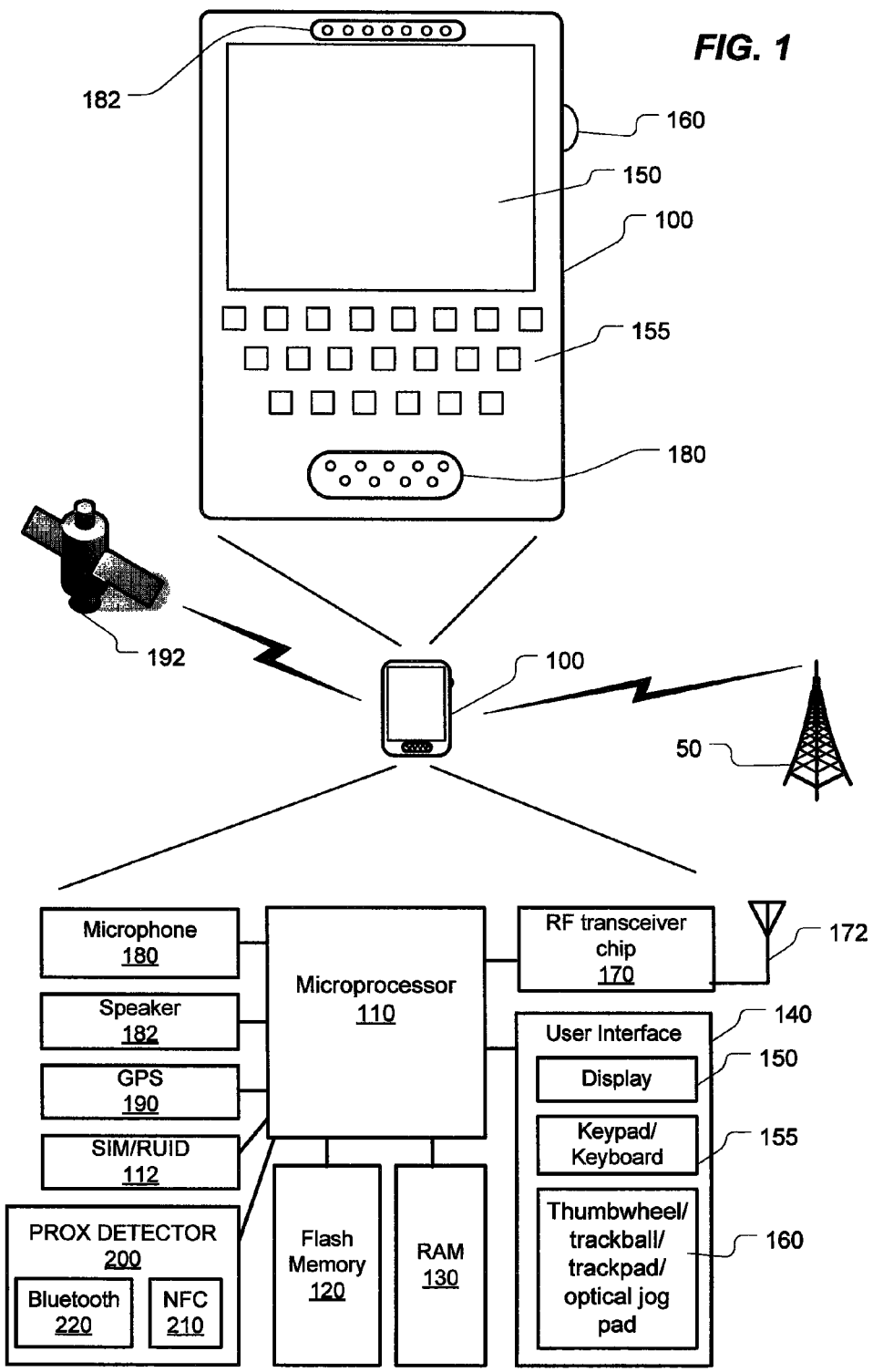
FIG. 1 is a schematic depiction of a wireless communications device as one example of a mobile device on which the present technology can be implemented.

FIG. 1 is a schematic depiction of a wireless communications device as one example of a mobile device 100 on which the present technology can be implemented. It should be expressly understood that this figure is intentionally simplified to show only certain main components. The mobile device 100 may include other components beyond what is illustrated in FIG. 1.

As depicted in FIG. 1, the mobile device 100 includes a microprocessor 110 (or simply a "processor") which interacts with memory in the form of random access memory (RAM) 120 and flash memory 130. The mobile device includes one or more input/output devices or user interfaces 140, such as a display screen 150 (e.g. a small LCD screen or touch-sensitive display screen), and a keyboard or keypad 155. The user interface may also include a thumbwheel, trackball, trackpad or optical jog pad 160. The device may also include a USB port or serial port for connecting to peripheral equipment.

Where the mobile device is a wireless communications device, the device further includes a radiofrequency (RF) transceiver 170 for communicating wirelessly with one or more base stations. The mobile device may include a Subscriber Identity Module (SIM) card 112 for GSM-type devices or a Re-Usable Identification Module (RUIM) card for CDMA-type devices.

For telephony, the mobile device may include a microphone 180 and a speaker 182 (and optionally an earphone jack).

The mobile device 100 may also include a positioning system such as a Global Positioning System (GPS) receiver (chipset) 190 for receiving GPS radio signals transmitted from one or more orbiting GPS satellites 192.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

The mobile device 100 also includes a short-range proximity detector 200. This short-range proximity detector 200 may include a transceiver chip, e.g. a Bluetooth® transceiver 210. The device may also include a near-field communications (NFC) chip 220 (also referred to herein as an NFC transceiver or NFC interface).

This novel mobile device 100 thus enables tagging of a location. The short-range proximity detector 200 detects the presence of another nearby device. This is referred to herein as a detection event. When a detection event occurs, the device automatically stores position data for the current location of the device. In some instances, where the GPS chipset is already in tracking mode, the device will have ready access to this position data. In other instances, where the GPS chipset is turned off, e.g. to save battery, the detection event will cause the device to automatically activate the GPS chipset and obtain a position fix. Thus, in one implementation, where the GPS chip is already in tracking mode, the detection event triggers storage of already available position data whereas in another implementation, where the GPS chip is off, the detection event triggers a first step of obtaining a GPS position fix and a second step of storing this position data. In other words, the processor 110 and memory 120, 130 then cooperate to store the position data in response to the detection event.

Position data for the current location may be obtained by a positioning system such as an onboard GPS chipset. Although GPS represents the best mode of implementing this technology presently known to the applicant(s), the mobile device could determine its location using another technique such as triangulation of signals from in-range base towers, such as used for Wireless E911. As is known in the art, Wireless Enhanced 911 services enable a cell phone or other wireless device to be located geographically using radiolocation techniques such as (i) angle of arrival (ADA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell.

Location data may also be passed from one mobile device to the other. For example, a first mobile device may pass data to a second mobile device if the first mobile device has its GPS receiver on and the second device does not, or if the location accuracy of the first mobile device's location-determining subsystem is known to be better than that of the second mobile device. This sharing of location information could be accomplished via NFC, Bluetooth® or over the wireless network. In some variants, there could be a negotiation between mobile devices after the tagging has taken place over the network or Bluetooth® to establish which device has the more accurate location so that both use the same specific location information. It should be understood that a rendezvous location may be established between two devices but shared with a group having more than two device, i.e. the location details may be shared with others in a group.

Alternatively, more granular position data may be obtained using other location-determining technique including identification of the nearest base station tower, identification of the current Visitor Location Register (VLR) etc. Of course, in these cases, the location data might be insufficient for certain purposes, e.g. an actual rendezvous, since the location data might simply indicate in which city or district the devices met.

The proximity detector 200 may use NFC, Bluetooth® or any other suitable short-range wireless connectivity technology. Specific implementations involving NFC and Bluetooth® will now be described below.

Automatic Location Tagging Using NFC

In one main implementation, the short-range proximity detector 200 comprises a near field communications (NFC) interface 220 or transceiver.

When two devices approach to within a few centimeters (a predetermined proximity threshold), the NFC interface performs a "handshake" between the two devices. This handshake may be manually triggered or automatically triggered (using an auto-discover mode that probes for or senses the proximity of other such devices). As noted above, the NFC proximity detector triggers the storage of location data for the current location of the device.

NFC is a short-range wireless technology that relies on magnetic field induction to enable communication between electronic devices in close proximity. This enables users of two or more mobile devices to connect the devices simply by touching or bringing the devices into close proximity with one another.

As is known in the art, NFC operates in the 13.56 MHz frequency band over a distance of approximately 20 centimeters while providing data transfer rates of about 100-400 kilobits per second. The NFC pairing event (detection event) may be used as a simple trigger for each device to collect and store its own location data. In a variant, one device collects and stores the location data and then shares (transmits) this data to the other device. This communication of data may be done via e-mail, SMS, or any other suitable communications protocol. The exchange of data may also be done using the NFC link that has been established. For two mobile devices to communicate using NFC, one mobile device must have an NFC reader/writer and one must have an NFC tag (i.e. an integrated circuit that stores data that can be read and written by the reader). This would enable unilateral communication from one device to another. This is also known as passive NFC mode, since only one device generates a radio field, while the other uses load modulation to transfer data. Bilateral communication may also be implemented so that either one of the devices can transmit data to the other. This is referred to as active NFC mode since both mobile devices broadcast RF signals.

Automatic Location Tagging Using Bluetooth®

In another main implementation, the short-range proximity detector 200 comprises a Bluetooth® transceiver 210.

Bluetooth® is a standard communications protocol primarily designed for low-power consumption, with a short-range capability (Class 1 for up to 100 m, Class 2 for up to 10 m and Class 3 for up to 1 m). The Bluetooth transceiver microchip in the mobile device broadcasts an RF signal in the 2.4 GHz short-range radio frequency band.

In yet other implementations, the short-range proximity detector may utilize another wireless technology such as, for example, WiFi, ZigBee®, or Ultra Wide Band (UWB).

The detection event that triggers location data storage may be the establishment of connectivity (i.e. when two devices are brought into close proximity with one another) or it may be the loss of connectivity (when two paired devices move away from each other such that communication link is severed). In some implementations, the detection event may be based on a predetermined signal strength threshold which is used to establish proximity. For example, the software on the device may decide to not register a weak Bluetooth® signal, but when the signal becomes strong, (exceeds a signal threshold) than the proximity tag is established.

In one implementation, the mobile device 100 includes a user input device adapted to receive user input requesting a route back to a previously tagged location. Upon receipt of this input, the device is configured to determine this route and to present the route in a suitable manner to the user of the device. This may entail, for example, displaying the route using a highlighted path that the user would follow to return to the previously tagged location.

In another implementation, the mobile device 100 includes a magnetometer for determining a compass direction. In this implementation, the display further presents a compass showing the direction back to the previously tagged location.

Figure 2:
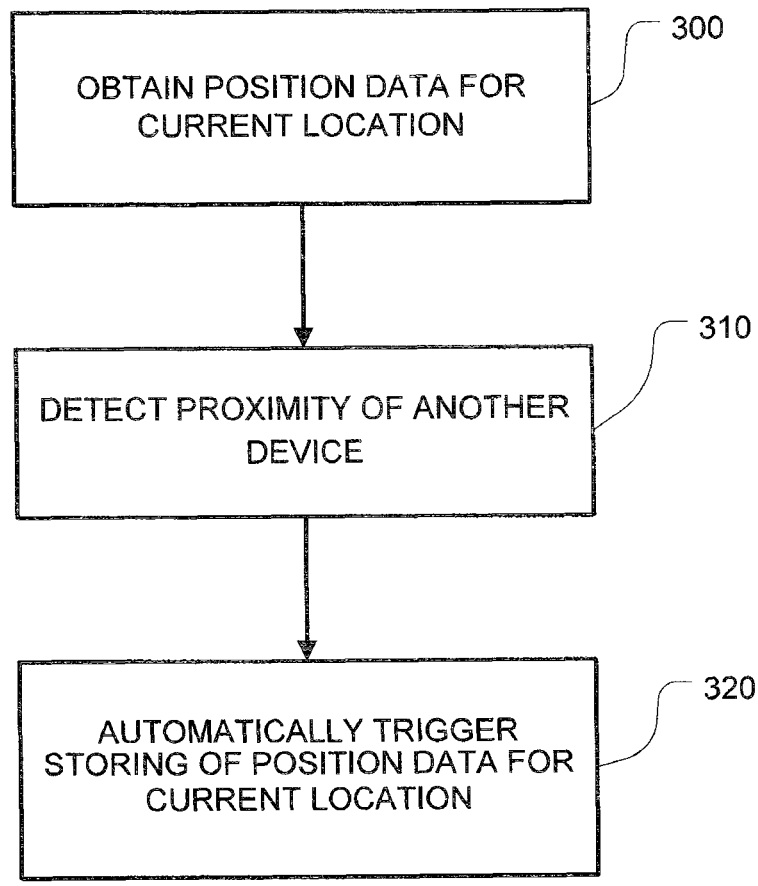
FIG. 2 is a flowchart outlining main steps of a novel method of tagging a location.

The foregoing technology also provides a novel method of tagging a location using a mobile device. This method, for which a flowchart is presented in FIG. 2, entails an initial step 300 of obtaining position data for a current location of the mobile device. At step 310, the device detects a proximity of another device using a short-range wireless interface. At step 320, the device automatically stores the position data for the current location of the mobile device in response to the detecting of the proximity of the other device.

Figure 3:
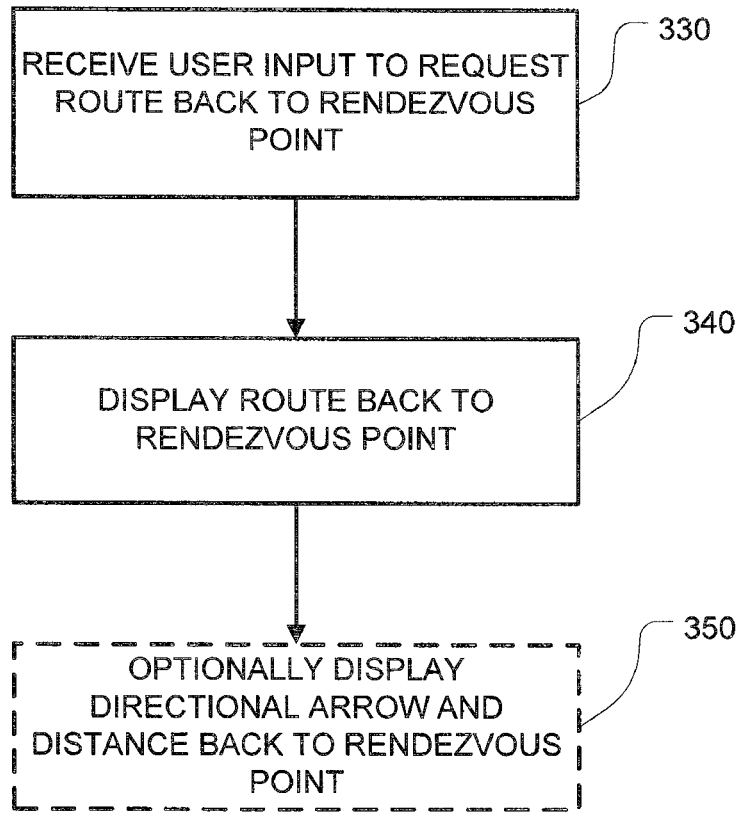
FIG. 3 is a flowchart outlining main steps of a related method of providing navigation instructions for returning to the tagged location.

FIG. 3 is a flowchart outlining main steps of a related method of providing navigation instructions for returning to the tagged location. This presumes that the devices have been paired and a common location has been established for a subsequent rendezvous. As shown in FIG. 3, at step 330, the method then includes a step of receiving user input to request a route for returning to a previously tagged location. The method further includes a step 340 of displaying the route for returning to the previously tagged location. Audible navigation instructions may also be provided along with the visual route directions.

In a variant, the method further comprises an optional step 350 of displaying a compass indicating a direction to the previously tagged location.

In a further variant, the method further comprises providing a list or map of all previously tagged locations to enable the user to manage, view, edit, delete or share these previously tagged locations. For example, the user may have received a phone call saying that the contact no longer wishes to rendezvous at the previously tagged location. In that case, the user may wish to delete the previously tagged location. As another example, the user may wish to invite a third party to also rendezvous at the previously tagged location. The previously tagged location can thus be e-mailed or otherwise sent to a third party by attaching the location data, optionally with predetermined text inviting the third party to the previously tagged location.

For still greater clarity, FIGS. 4-7 illustrate the operation of the present technology.

Figure 4:
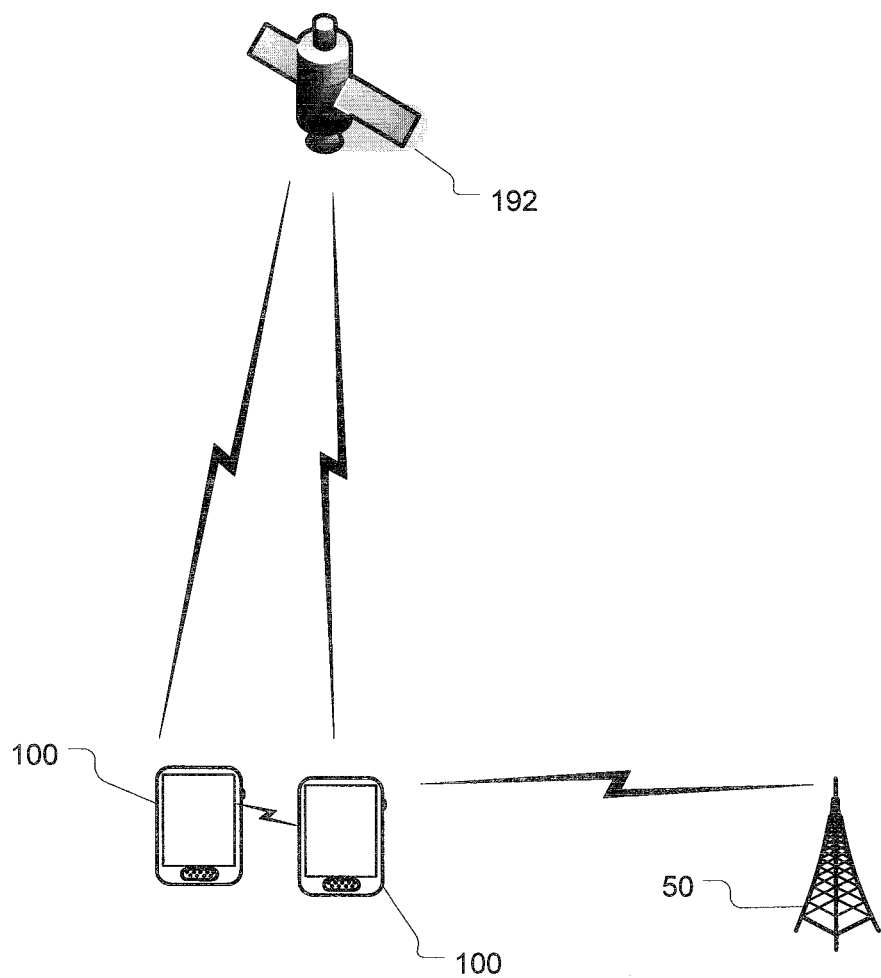
FIG. 4 is a schematic depiction of an initial act of pairing two mobile devices to automatically tag a location for a subsequent rendezvous.

FIG. 4 is a schematic depiction of an initial act of pairing two mobile devices 100 to automatically tag a location for a subsequent rendezvous. By bringing the two mobile devices 100 into close proximity with one another, as depicted in FIG. 4, the NFC chip inside each device 100 triggers the automatic registration (storage) of location data. This sets a rendezvous point for the devices so that their respective users can easily navigate back to the rendezvous point. In a variant, the devices may interact with a calendar application to set a reminder for returning to the rendezvous point. The devices may prompt each respective user to enter a time when they should be back. An audible and/or visual alarm or notification will automatically remind the user, depending on both the user's new location and the current time, to give the user sufficient time to return to the rendezvous location for the pre-agreed time. Determining the sufficient time to return to the rendezvous location may be based on the time taken to reach the new location from the rendezvous location or the expected travel time based on the most direct route back to the rendezvous location. Alternatively, one device may set the rendezvous time and communicate it to the other device in the form of an appointment that is automatically linked to the rendezvous point.

Figure 5:
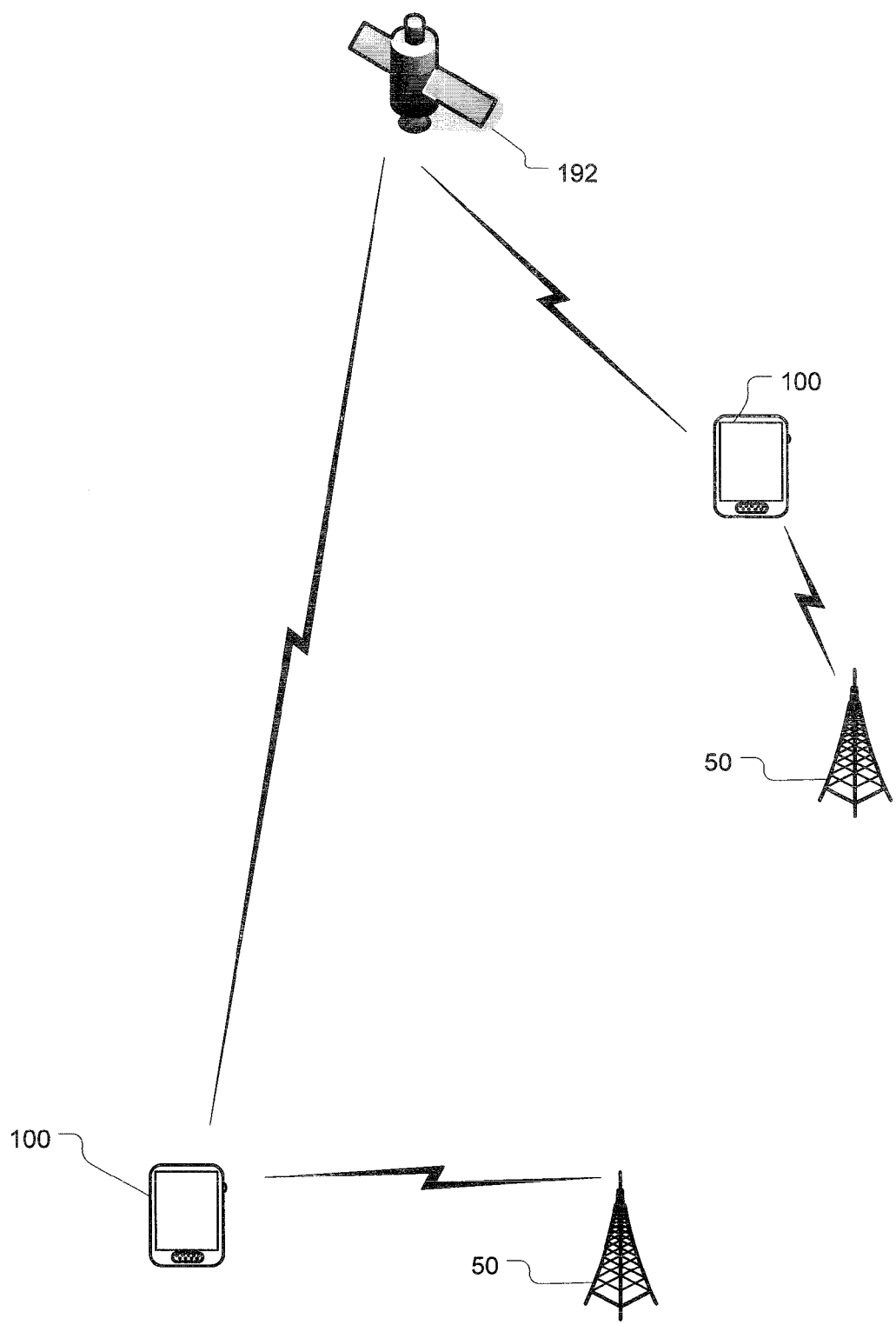
FIG. 5 is a schematic depiction of the mobile devices after they have strayed from the tagged location.

FIG. 5 is a schematic depiction of the mobile devices 100 after they have strayed from the tagged location. When the devices are remote from each other, the rendezvous time and/or location may be modified. In other words, the devices may be configured to enable the users to modify the location and/or time of their rendezvous by sending a message (e.g. e-mail, SMS or other communication) from one device to the other device. The message may be in a format that the device automatically recognizes as a rendezvous modification message, thus permitting the device receiving this message to automatically change the stored rendezvous parameters. Upon receipt of the rendezvous modification message, the recipient is notified that a request to modify the rendezvous time and/or location has been received, prompting the user to accept or reject the proposed change. Upon acceptance by the recipient, the rendezvous parameters are changed automatically and an acceptance message is sent back to the other device to indicate that the new rendezvous is acceptable and that the modification request has been accepted. Alternatively, in response to the rendezvous modification message, the device may present an option to propose a new time and/or location for the rendezvous.

Figure 6:
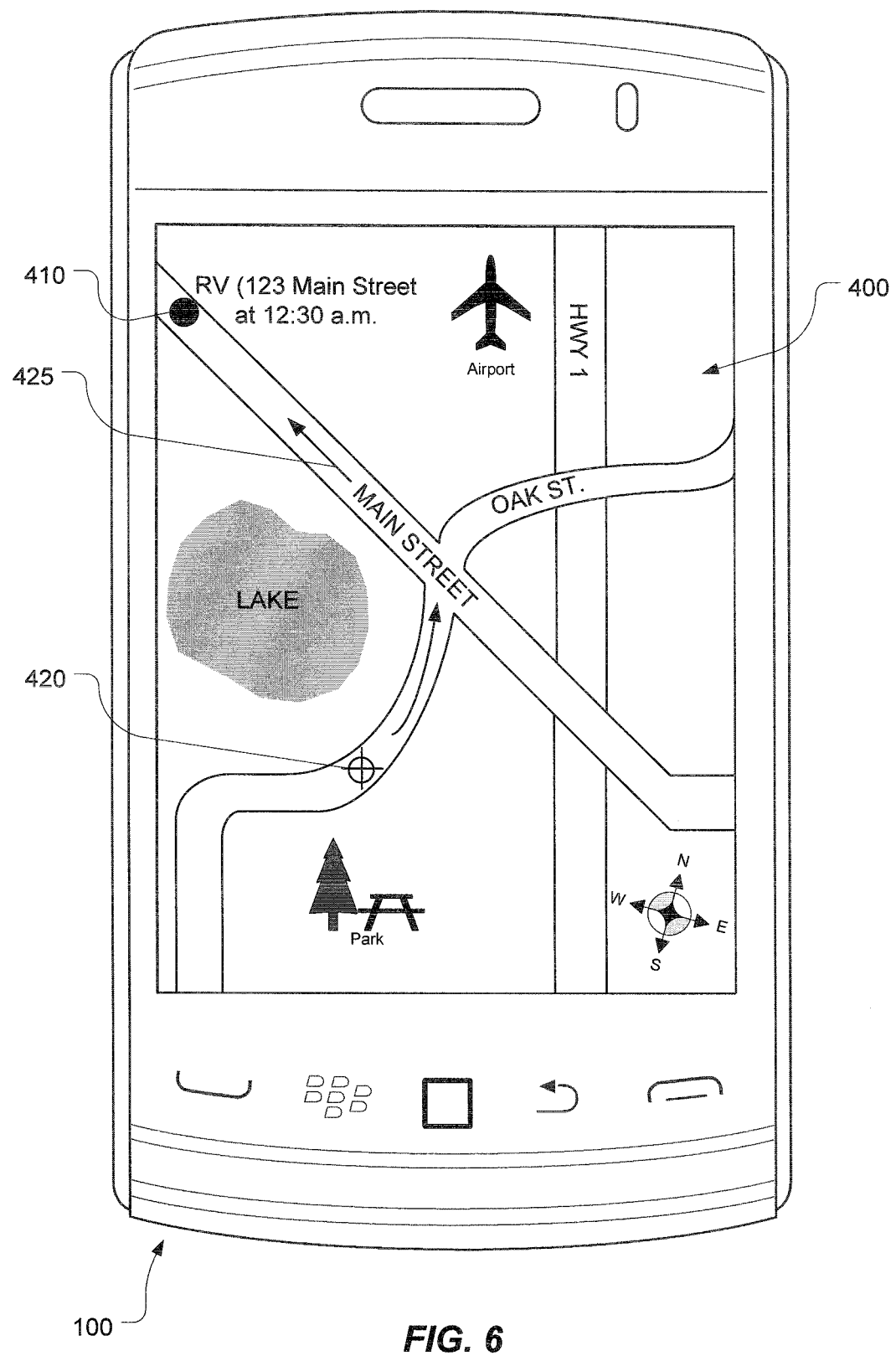
FIG. 6 is a schematic depiction of a map displayed on a mobile device to enable the user of the device to navigate back to the tagged location.

FIG. 6 is a schematic depiction of a map 400 may be presented on one of the mobile devices to enable the user of the device to navigate back to the tagged location 410 from the new current location 420 of the device. The map 400 may present the route with a highlighted or dashed-line path, a sequence of arrows 425, a set of textual directions or audible directions, or any suitable combination thereof.

Figure 7:
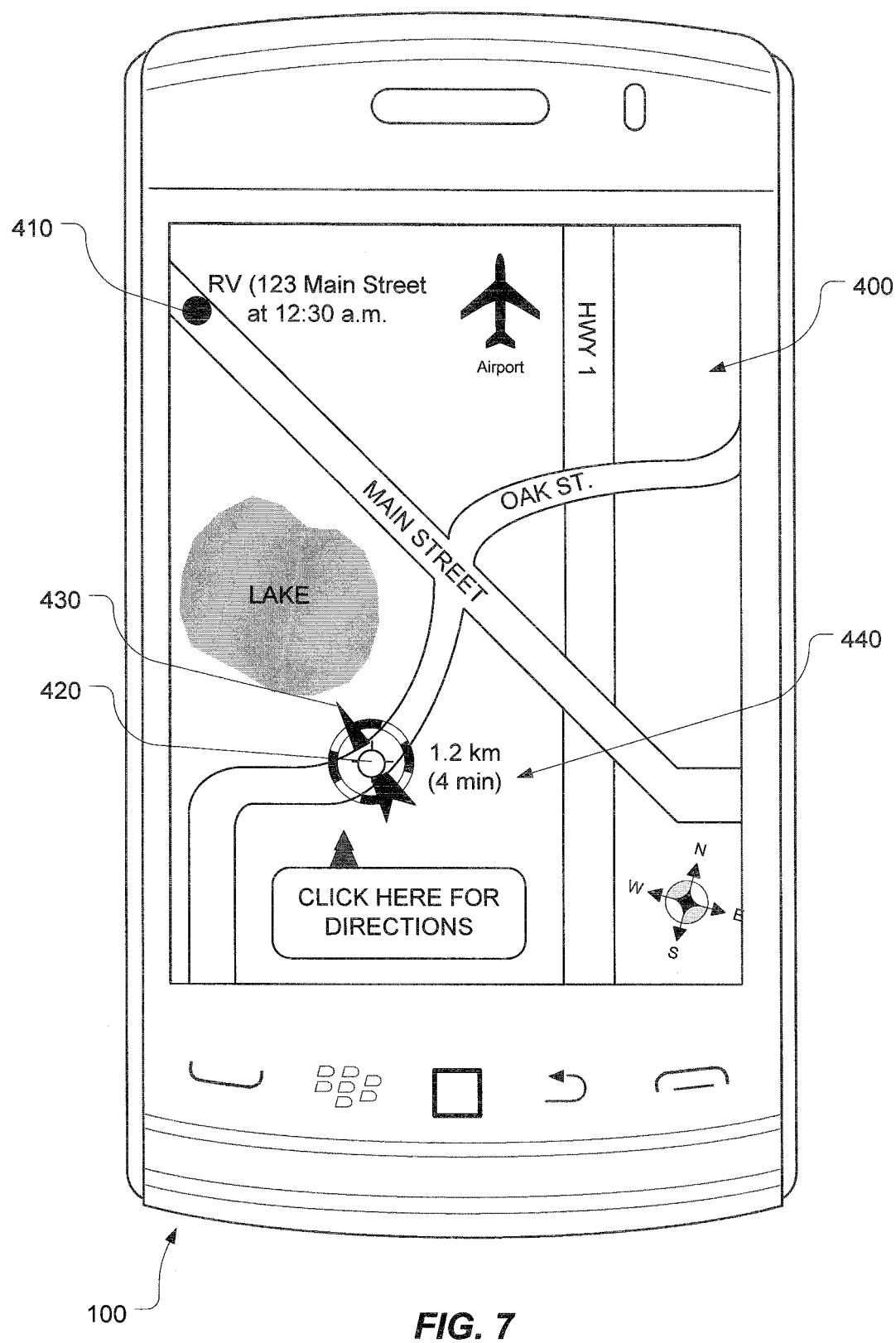
FIG. 7 is a schematic depiction of a variant of the user interface presented in FIG. 6 that further includes a directional arrow for indicating a direction back to the tagged location.

FIG. 7 is a schematic depiction of a variant of the user interface presented in FIG. 6 that further includes a directional arrow 430 for indicating a direction back to the tagged location. Optionally, a distance and/or travel time estimate 440 may also be displayed onscreen. The directional arrow will point in the direction back to the previously tagged location. Where the device is storing more than one tagged location, the user interface permits the user to view all of the tagged locations and to switch between the tagged locations.

In a variant, the map may be configured to automatically zoom (change scale) to encompass both the current location of the mobile device and the rendezvous location. This automatic re-zooming facilitates navigation back to the rendezvous location.

In another variant, the travel time estimate may take into account weather, road condition data, and real-time traffic data received by the mobile device. The weather, road condition and/or real-time traffic data may be used to calculate how long it will presently take to travel back to the rendezvous location given the current road and traffic conditions. The alarm/notification function on the mobile device (which notifies the user when he or she should begin to return to the rendezvous location) may also be responsive to any real-time traffic conditions, thereby dynamically adjusting the time when the alarm is triggered based on the changing travel time estimate. Historical traffic data may also be useful for determining when to trigger the alarm. For example, if the user is traveling through a location known to have extreme rush hour traffic, then the alert may be triggered pre-emptively to signal to the user that he should depart now to the rendezvous lest he get stuck in heavy rush hour traffic.

The foregoing technology may be used in a variety of applications such as, for example, setting up a rendezvous point for two mobile device users, as discussed above, remembering where a car is parked, remembering where a hotel room is situated, and remembering where the user's other mobile device has been placed, to name but a few. The technology can not only be used to pair two mobile devices (to establish a rendezvous point) but also between a single mobile device and other types of machines, equipment or apparatuses that may also be equipped with short-range wireless transceivers such as a desktop computer, a smart appliance, an automobile, a boat, an aircraft, etc.

In the foregoing examples, the detection event was the establishing of a communication link (NFC, Bluetooth® etc.) or the loss of connectivity. However, the detection event may also be events such as turning off a device (Bluetooth®-equipped car, Bluetooth®-equipped laptop, mobile device, etc.). Activating (turning on) a device, appliance or machine may also constitute the detection event for triggering the automatic storage of location data. Yet other events may be used to constitute the detection event. For example, closing a hotel door that has an NFC card reader may also trigger the storage of location data on the mobile device.

This new technology has been described in terms of specific implementations and configurations which are intended to be exemplary only. Persons of ordinary skill in the art will appreciated, having read this disclosure, that many obvious variations, modification and refinements may be made without departing from the inventive concepts presented herein. The scope of the exclusive right sought by the Applicant(s) is therefore intended to be limited solely by the appended claims.

The invention claimed is:

1. A method, performed by a first mobile device, of tagging a location, the method comprising:
   obtaining, by the first mobile device, position data for a current location of the first mobile device;
   detecting a proximity of a second mobile device using a short-range wireless interface; and
   storing the position data for the current location of the first mobile device in response to the detecting of the proximity of the second mobile device without transmitting the position data.

2. The method as claimed in claim 1 further comprising:
   receiving user input to request a route for returning to a previously tagged location; and
   displaying the route for returning to the previously tagged location.

3. The method as claimed in claim 2 further comprising displaying a compass indicating a direction to the previously tagged location.

4. The method as claimed in claim 1 wherein obtaining the position data comprises generating the position data using a Global Positioning System (GPS) receiver on the first mobile device.

5. The method as claimed in claim 1 wherein detecting the proximity of the second mobile device comprises using a near field communication (NFC) interface as a proximity detector.

6. A first mobile device for tagging a location, the first mobile device comprising:
   a short-range proximity detector for detecting a proximity of a second mobile device;
   a positioning system for generating position data for a current location of the first mobile device; and
   a processor operatively connected to a memory for storing the position data for the current location of the first mobile device in response to a detection event of the proximity detector, wherein the position data is not shared with any other device.

7. The first mobile device as claimed in claim 6 wherein the short-range proximity detector comprises a near field communication (NFC) interface.

8. The first mobile device as claimed in claim 7 further comprising:
   a user input device for receiving user input requesting a route back to a previously tagged location; and
   a display for displaying the route for returning to the previously tagged location.

9. The first mobile device as claimed in claim 8 further comprising a magnetometer for determining a direction and wherein the display further comprises a compass showing the direction back to the previously tagged location.

10. The first mobile device as claimed in claim 6 wherein the short-range proximity detector comprises a Bluetooth transceiver.

11. The first mobile device as claimed in claim 10 further comprising:
    a user input device for receiving user input requesting a route back to a previously tagged location; and
    a display for displaying the route for returning to the previously tagged location.

12. The first mobile device as claimed in claim 11 further comprising a magnetometer for determining a direction and wherein the display further comprises a compass showing the direction back to the previously tagged location.

13. The first mobile device as claimed in claim 6 further comprising:
    a user input device for receiving user input requesting a route back to a previously tagged location; and
    a display for displaying the route for returning to the previously tagged location.

14. The first mobile device as claimed in claim 13 further comprising a magnetometer for determining a direction and wherein the display further comprises a compass showing the direction back to the previously tagged location.

15. A non-transitory computer-readable medium comprising instructions in code which when loaded into a memory and executed by a processor of a first mobile device causes the first mobile device to:
    obtain position data for a current location of the first mobile device;
    detect a proximity of a second mobile device using a short-range wireless interface; and
    store the position data for the current location of the first mobile device in response to the detecting of the proximity of the second mobile device without transmitting the position data.

16. The computer-readable medium as claimed in claim 15 wherein the code is further configured to instruct the processor to interact with a near field communication (NFC) interface as the proximity detector.

* * * * *